United States Patent [19]

Poppo

[11] Patent Number: 4,772,031
[45] Date of Patent: Sep. 20, 1988

[54] ACRYLIC ADHESIVE SEALANT AND LEAK SEALING METHOD

[75] Inventor: Joseph M. Poppo, Sunnyvale, Calif.

[73] Assignee: AMP Incorporated, Harrisburg, Pa.

[21] Appl. No.: 374,362

[22] Filed: May 3, 1982

[51] Int. Cl.[4] .............................. F16J 15/14
[52] U.S. Cl. ........................... 277/1; 277/34.3; 277/72 FM; 206/219
[58] Field of Search ......... 206/219; 277/34.3, 72 FM, 277/1

[56] References Cited

U.S. PATENT DOCUMENTS

| 2,815,966 | 12/1957 | House | 277/34.3 |
|---|---|---|---|
| 3,222,076 | 12/1965 | Hollingsworth | 277/34.3 |
| 3,367,890 | 2/1968 | McManbale | 260/2.5 |
| 3,620,990 | 11/1971 | Hazen et al. | 260/2.5 R |
| 3,655,213 | 4/1972 | Forsgren | 277/1 X |
| 3,684,136 | 8/1972 | Baumann | 206/219 |
| 4,192,924 | 3/1980 | Crivello | 521/126 |
| 4,277,568 | 7/1981 | Dawson et al. | 521/68 |
| 4,358,417 | 11/1982 | Beinhauer | |

FOREIGN PATENT DOCUMENTS

| 2305660 | 10/1976 | France | 277/1 |
|---|---|---|---|
| 1536682 | 12/1978 | United Kingdom | 277/1 |
| 227021 | 11/1966 | U.S.S.R. | 277/72 FM |
| 690217 | 5/1979 | U.S.S.R. | 277/72 FM |

Primary Examiner—Robert S. Ward
Attorney, Agent, or Firm—Katherine A. Nelson

[57] ABSTRACT

A sealant system for repairing leaking pipes comprised of an elastomeric modified acrylic adhesive, exothermically curable upon activation by a catalyst, and a blowing agent. After mixing the components, the sealant is pumped into a mold cavity located over the leak. The mold is sealed and the reaction of the acrylic proceeds to completion concomitant with a rise in temperature, decomposition of the blowing agent and an increased pressure within the mold. The internal pressure thus generated forces the sealant into the interstices of the pipe. The sealant upon complete curing and solidification is bonded to the surface of the pipe.

24 Claims, 4 Drawing Sheets

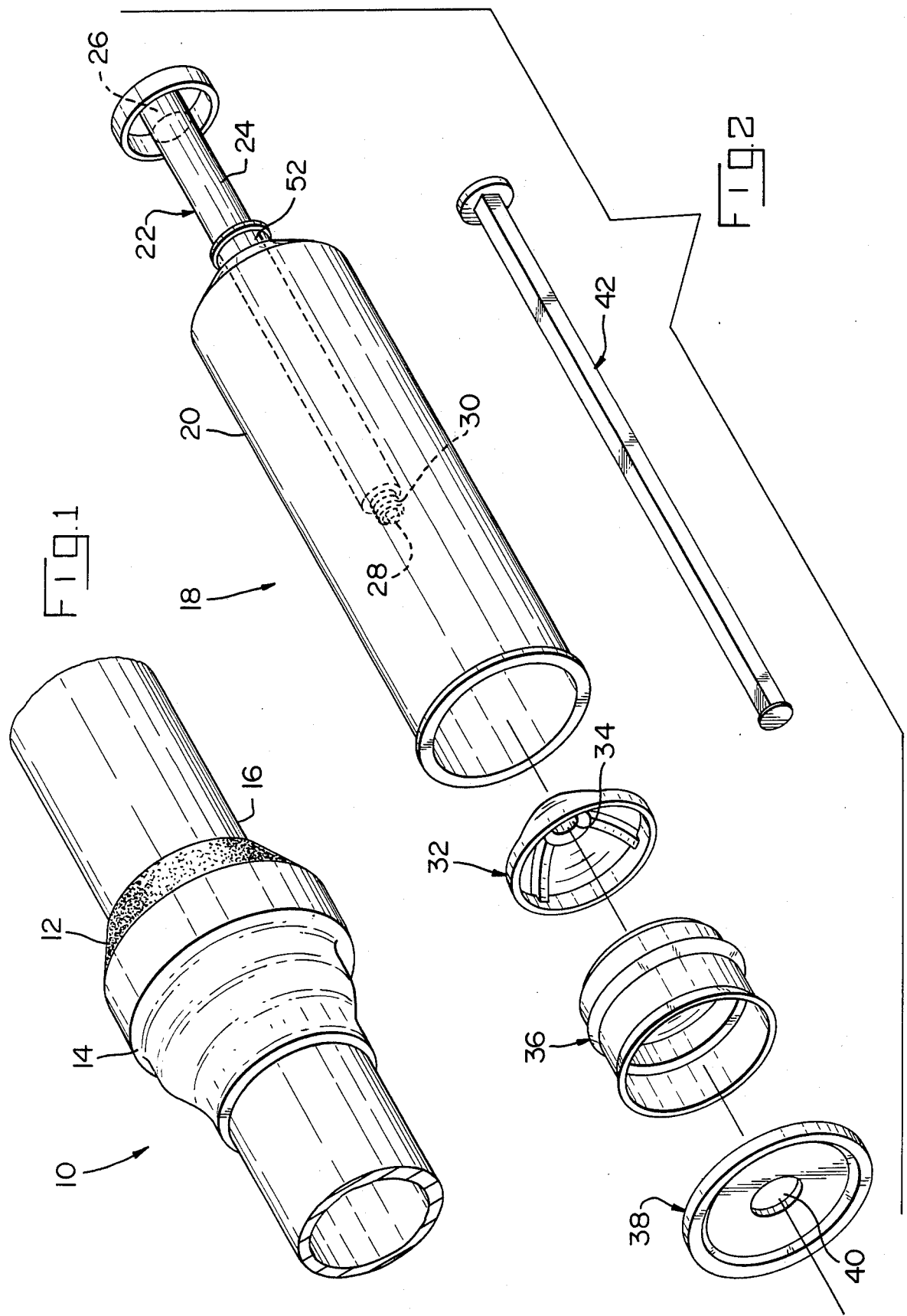

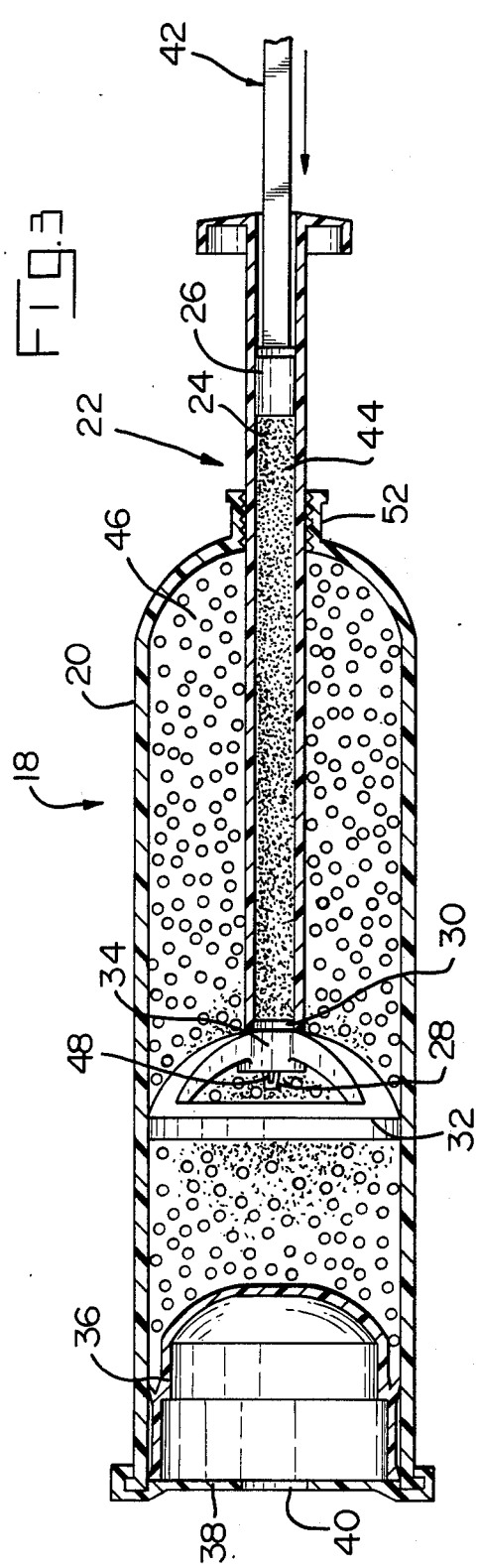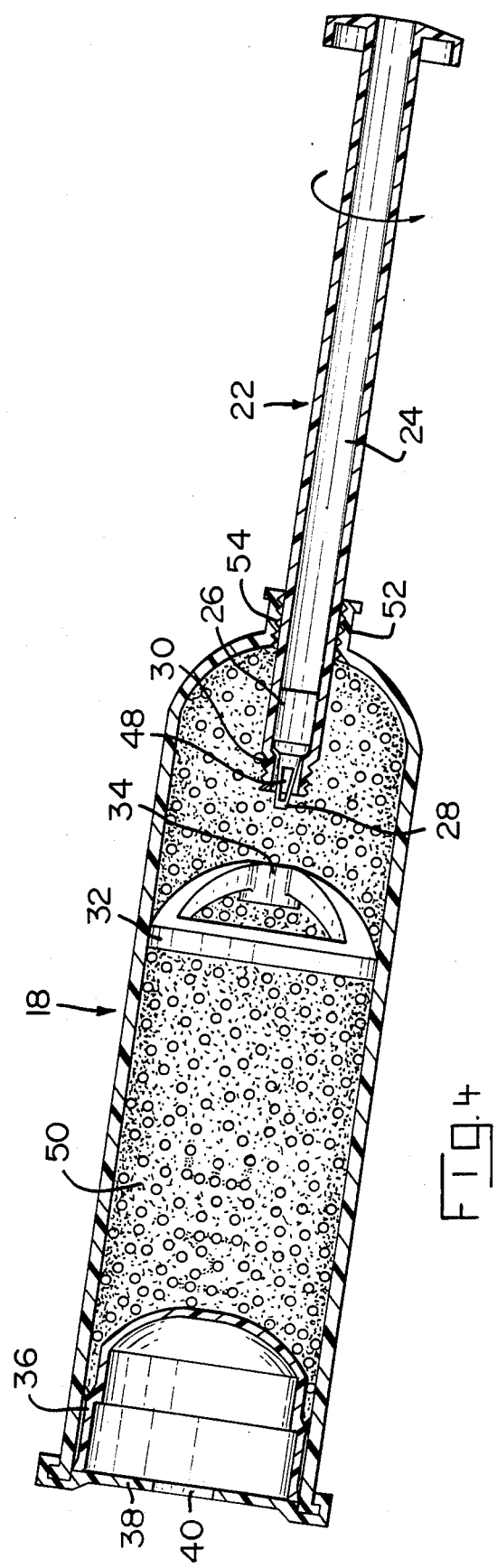

ACRYLIC ADHESIVE SEALANT AND LEAK SEALING METHOD

FIELD OF THE INVENTION

This invention relates to sealants used to repair leaks in pipes which transport gas, water and the like.

BACKGROUND OF THE INVENTION

There is a need for a quick, easy and effective method for sealing leaking pipes, particularly underground pipes such as gas, water and sewer lines. This need is most acute in areas that have underground lines that were laid a number of years ago. Many of the leaks in the underground lines occur in the pipe joints due to deterioration of the original sealing materials. Further, the offending joints often have a plurality of minute leaks, making it diffcult to deduce the precise place repairs are needed. Also, it is particularly desirable to have a method of repair that enables the line to remain in service while it is being repaired so that there is a minimum amount of inconvenience to persons affected by the leaking line. Furthermore, a seal is needed that will provide an impervious barrier to prevent the escape of contents transported in the line, as well as the infiltration of contaminants from the surrounding environment.

The present invention is directed to solve these and concomitant problems. The disclosed invention teaches the use of a mixture of an exothermically reactive thermosettable acrylic adhesive, a blowing agent and a catalyst, for sealing leaks in pipes. One such use is disclosed in patent application Ser. No. 266,398 filed May 22, 1981, now U.S. Pat. No. 4,358,417, issued Nov. 9, 1982, and assigned to this Assignee, wherein the herein disclosed sealant was used to repair leaking bell and spigot joints.

In practicing this invention, it is essential that the sealant be used with a mold that completely surrounds and encases the leaking member and provides a cavity in the immediate vicinity of the leak which can be filled with the sealant. The sealant herein disclosed is primarily composed of elastomeric modified acrylic adhesive which is exothermically curable upon mixing with an appropriate catalyst. The other essential component of the sealant is a blowing agent which decomposes, releasing gaseous by-products during the exothermic reaction of the activated acrylic. In the absence of a catalyst, a mixture of the acrylic and blowing agent can be stored safely until needed. The catalyst is added to and mixed with the sealant and blowing agent immediately prior to insertion into the mold.

Once the acrylic has been activated, the temperature of the mixture begins to rise. It is essential, therefore, to transfer the activated mixture to the mold prior to appreciable reaction of the acrylic. When the appropriate temperature is reached, the blowing agent decomposes thus causing an increase in pressure within the mold. The pressure generated by the gaseous by-products produced by the decomposition of the blowing agent and by the rising temperature in the closed mold is greater than the pressure of the leaking gas or other material being transported through the pipe. Because of the internal pressure of the sealant mixture, the mixture expands and flows into the interstices of the pipe. Upon complete curing and solidification of the sealant, the sealant is bonded to the surface of the pipe. A filler or a plasticizer or both may be added to the acrylic-blowing agent mixture to increase the adhesive strength and the flexibility of the cured sealant. An odor mask may also be added.

The resulting seal is a dense highly cross-linked solid with numerous macroscopic isolated internal blowholes. The seal is impervious to moisture and is hihgly resistant to chemicals.

The disclosed invention offers many distinct advantages over the prior art. In repairing leaking underground pipes, such as gas lines and the like, it is necessary, to excavate the area surrounding the leaks. When using the disclosed invention, excavation can be kept to a minimum. Only an area sufficient to enable the leaking pipe to be cleaned and the mold to be placed around the leak need be dug. The sealant can be injected into the mold from ground level, thus eliminating the necessity of deep excavation and location shoring to enable someone to enter the excavation area. Furthermore, the only equipment needed to repair the leak, once the excavation has been made, is the mold and the container of sealant. With this invention, there is no need for an external source for applying heat, either prior to or after the injection of the mixture into the mold. Neither is there a need for an external source of pressure to force the sealant into the leaking interstices of the pipe.

DESCRIPTION OF THE DRAWINGS

FIG. 1 is a perspective view showing the cured sealant on a bell and spigot joint.

FIG. 2 is a three dimensional exploded view of a two compartment container used to store, mix and inject the sealant into a mold.

FIG. 3 shows a fractional cross-sectional view of a two compartment container filled with the components of the sealant.

FIG. 4 shows a cross-sectional view of the same container illustrating the removal of the dasher rod after the components of the sealant have been mixed.

PREFERRED EMBODIMENT OF THE INVENTION

Figure 5:
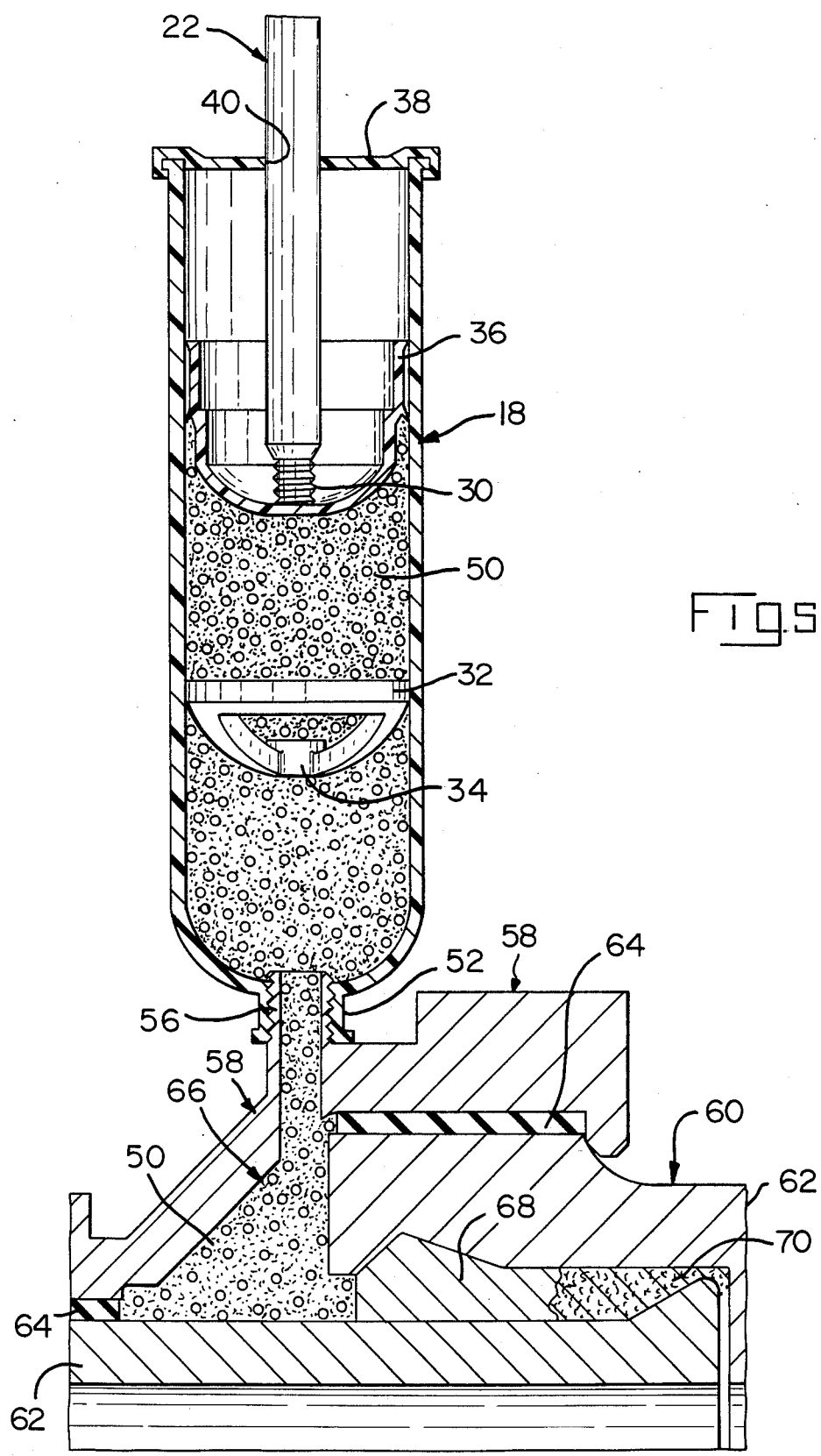
FIG. 5 is a fragmentary cross-sectional view of the sealant mixture being injected into a mold that surrounds a bell and spigot joint.

Referring to FIG. 1, a bell and spigot joint 10 has been repaired using the invention. The cured adhesive seal 12 surrounds and has adhered to the end of the bell 14, the pipe 16 and the adjoining surfaces.

FIG. 2 illustrates the dual compartment container 18 and the ram rod 42 used in the practice of the invention. The container 18 is comprised of a main body compartment 20, a dasher rod 22 having second compartment 24 therein, a dasher 32, plunger 36, and an end cap 38 having an opening 40, therein. The dasher rod 22 further contains therein a dasher rod retainer plug 26 at one end and a dasher rod valve 28 at the other end. The valve end 30 of the dasher rod has exterior threads thereon.

When the unit is assembled, as shown in FIG. 3, the threaded end 30 cooperates with a threaded opening 34 in the dasher 32. Referring now to both FIGS. 2 and 3, in accordance with the invention, the second compartment 24 in the dasher rod 22 is first filed with a catalyst 44 and then is inserted into the upper end of the dual compartment container. The main body compartment 20 is filled with a mixture 46 of an elastomeric modified acrylic, a filler, a plasticizer and a blowing agent. The dasher 32 and a plunger 36 are then inserted into the bottom end of the container and the end cap 38 is attached. The threaded end 30 of the dasher rod 22 is inserted into the threaded dasher opening 34.

As is illustrated in FIGS. 3 and 4, the sealant system is activated by pushing the ram rod 42 against the dasher rod retainer plug 26, forcing the plug to move inwardly down the length of the dasher rod 22. As force is exerted against the plug 26, the dasher rod valve 28 is forced outwardly from the end of the dasher rod, exposing opening 48 in the valve 28 which permits the expulsion of the catalyst 44 from the second compartment 24. The contents of two compartments 20 and 24 are then mixed to produce the activated sealant 50 by inwardly and outwardly moving the dasher rod 22. Once the mixing is completed, it is necessary to transfer sealant 50 from the container 18 to the location of the leak before there is significant polymerization of the acrylic.

Figure 6:
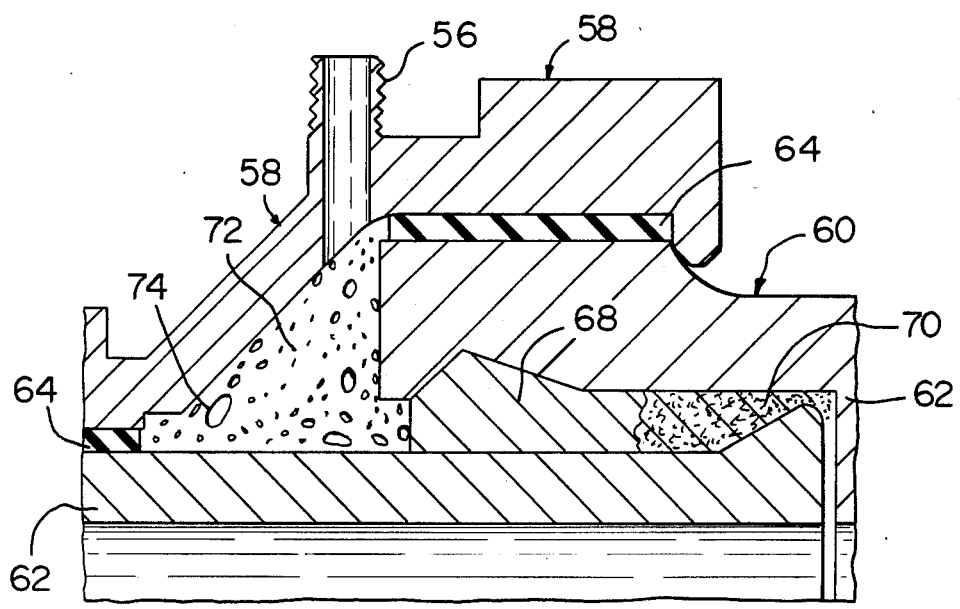
FIG. 6 is a repaired bell and spigot joint.

As is shown in FIG. 4, when the mixing has been completed, the dasher rod 22 is disengaged from the dasher 32 and removed from the main compartment 20. Although the dasher rod 22 was slideably-engaged with the top 52 of the container 18, the inside 54 of the top is threaded, as is shown in FIGS. 3 and 4, to enable the container 18 to be attached to a threaded nozzle 56 in a mold 58, as is illustrated in FIGS. 5 and 6. The mold 58 completely surrounds and encloses the leaking bell and spigot joint 60.

As is illustrated by FIGS. 5 and 6, in attaching the mold 58 around the pipes 62 and the joint 60, rubber gaskets 64 or other similar materials are used at the peripheral edges of the mold in order to ensure an airtight seal between the mold 58 and the irregular surfaces of the pipes 62 and the joint 60. The mold further provides a cavity 66 over the leading area. While it is necessary to remove loose particles from the surface of the pipes 60 and the joint 58, in order to have maximum adhesion of the sealant 66 to the surface, it is not necessary to remove the lead 68 and oakum packing 70 used when the joint was originally sealed.

As is illustrated in FIG. 5, activated sealant 50 is transferred from the container 18 to the mold cavity 66 by attaching the container 18 to the mold nozzle 56, inserting the dasher rod 22 through the hole 40 in the end cap 38 and exerting force against the dasher rod 22 to push the plunger 36 from the bottom to the top of the container 18 accompanied by the expulsion of the activated sealant 50 into the mold cavity 66. Once the contents of the container have been expelled, the container is removed from the nozzle 56, the nozzle is plugged and the reaction of the activated sealant 50 is allowed to run to completion and cure.

FIG. 6 illustrates the solid cured sealant 72 and the repaird bell and spigot joint 58. FIG. 6 further illustrates the isolated internal blowholes 74 that are found in the cured sealant 72.

Figure 7:
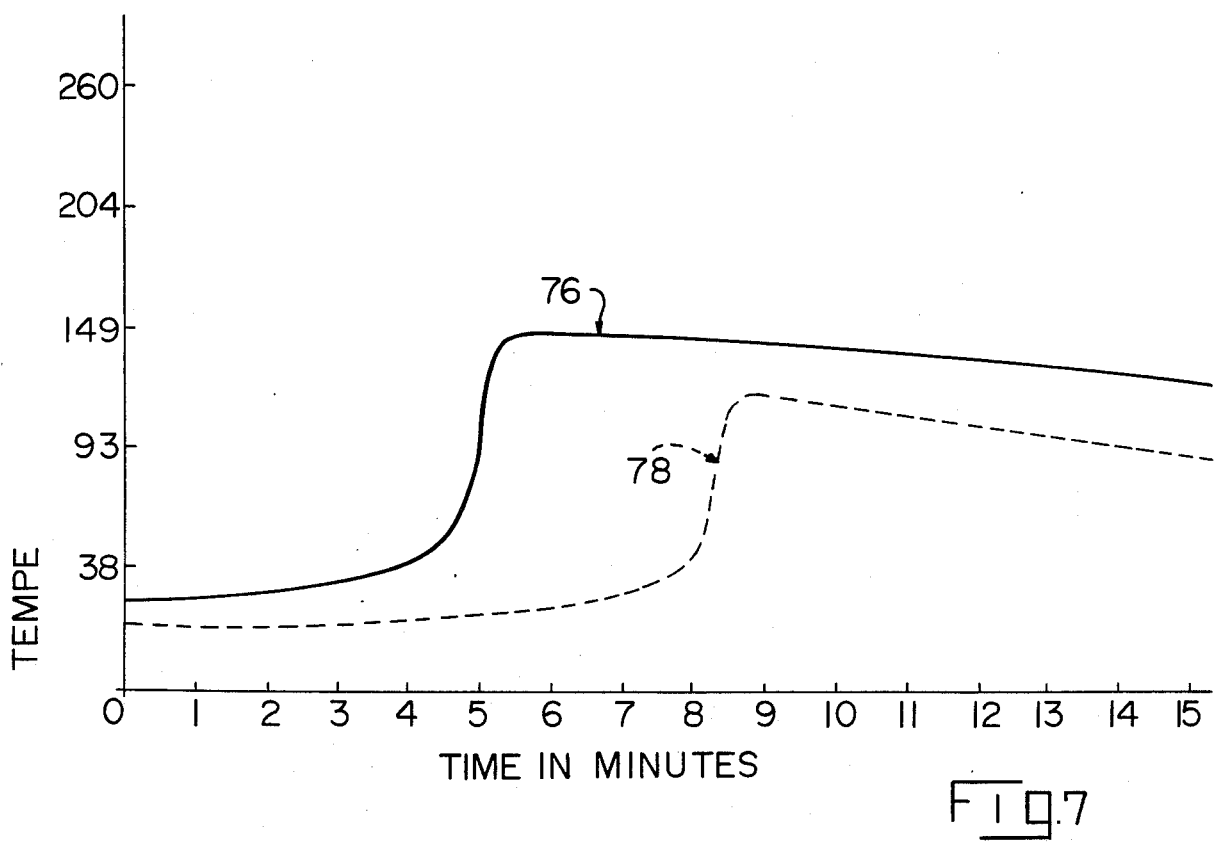
FIG. 7 is a thermogram showing the length of cure time required for two samples of activated sealant mixture to reach their peak exotherms.

FIG. 7 is a thermogram showing the length of cure time required for two samples of activated sealant mixture to reach their peak exotherms. The temperature changes were measured by attaching a chart recorder to a thermocouple that had been inserted into a beaker containing a 50 gram sample of the activated sealant mixture.

The solid line 76 is the temperature versus time curve obtained when the test was conducted at an ambient temperature of 21° C. The broken line 78 is the temperature versus time curve obtained when the test was conducted at an ambient temperature of 13° C.

As is shown by the curves 76 and 78, the temperature of the activated sealant increases slowly at first, then increases rapidly during a short period of time and then slowly decreases. The length of time required for the rapid temperature increase to begin is determined by the initial temperature of the components. When the initial temperature was 21° C., curve 76, the rapid change occurred four minutes after activation and the temperature increased 66° C. in approximately 40 seconds. When the initial temperature was 13° C., curve 78, the rapid change occurred eight minutes after mixing and the temperature increased 66° C. in approximately 60 seconds.

The sealant system is comprised of 50-90% by weight of a thermosettable elastomeric modified acrylic adhesive of the type disclosed in U.S. Pat. No. 3,873,640 and incorporated by reference herein, 5-20% of a filler, 5-20% of a plasticizer and 2-10% of a blowing agent. In the preferred embodiment, 81.2% of an elastomeric modified methyl methacrylate was used. This material is available from Hughson Chemicals under the trade name Versilok 506. Analysis of a sample of Versilok 506 confirmed that this material is exemplified in Example VII in the above mentioned patent.

To reduce shrinkage of the cured adhesive, and improve the adhesion of the sealant, 8.1% by weight of a polyethylene powder filler was added to the methacrylate. To increase the flexibility of the seal, 8.1% of dioctyl maleate, a plasticizer was also added. About 2% of the blowing agent p. p-oxybis (benzenesulfonyl hydrazide) was also used. This is available from a number of sources. The particular formulation used herein was Celogen OT, available from Uniroyal Chemical. The catalyst used to initiate the polymerization reaction of the acrylic was benzoyl peroxide. In addition to initiating the free radical chain reaction polymerization of the acrylic, benzoyl peroxide also lowered the temperature at which the benzenesulfonyl hydrazine decomposed.

Decomposition of the blowing agent occurred sometime during the rapid rise in temperature as illustrated in FIG. 7, and before the peak exotherm was reached. The peak exotherm of the activated sealant occurred from 135°–140.5° C.

It is important that the blowing agent decompose and release its gaseous by-products at the proper time during the polymerization reaction. The sealant should be in a semi-cured, semi-rigid state and sufficiently viscous to prevent the gas from escaping or outgassing, thus rendering the seal less effective.

The two compartment container shown in the drawings and used for repairing the bell and spigot joints was an Injection Style Semkit available from Semco.

Deflection tests conducted on seals applied to known leaking bell and spigot joints revealed that the joint could be deflected 3° under 1.176 Kg/sq.cm without harming the repaired joint. Instron tests for adhesion of the sealant to the metal required an average of 101.94 Kg.sq.cm at ambient temperature to shear the bond. The test procedure followed was that provided by the American Society for Testing and Materials, Test Number D 1002 for lap shear bond values.

One repaired system was tested for leaks using a Mass Spectrometer Leak Detector, NRC 925. Prior to the test, the seal had cured for 12 hours. No leaks were detected. The system was then pressurized to 6±0.7 Kg/sq.cm gauge and submerged in a water bath at 87.7±5° C. The test was run for 1400 hours with no loss of internal pressure during that time. This test is equivalent to an actual life expectancy of 20 years.

A variety of compounds may be used in the practice of this invention, provided that the combination of the acrylic and blowing agent satisfy the essential conditions as disclosed herein. As can be seen from FIG. 7, the polymerization of the exothermic acrylic should produce a rapid rise in temperature during a short time period. This is essential so that the polymerization is substantially complete and the sealant is in a semi-solid state before the blowing agent is triggered by the increased temperature.

What is claimed is:

1. In the method of sealing a leak in a pipe which comprises the steps of providing a surrounding mold on the pipe with a mold cavity located over the leak and then introducing sealing material into the mold cavity, the method comprising the steps of:

intermixing in a separate sealed chamber an exothermically reactive thermosettable acrylic adhesive, a blowing agent and a catalyst which is effective to activate the acrylic, pumping the resulting mixture from the sealed chamber into the mold cavity and filling the mold cavity prior to significant reaction of the acrylic, maintaining the mold in a sealed condition and permitting the reaction of the acrylic to proceed to completion with a concomitant temperature rise, decomposition of the blowing agent and an increase of the pressure in the mold whereby the partially cured sealant mixture is flowed under internal pressure into the interstices of the pipe and upon complete curing and solidification is bonded to the surface of the pipe.

2. The method as recited in claim 1 wherein the acrylic adhesive is comprised of an elastomeric modified polyacrylic and an acrylic monomer.

3. The method as recited in claim 2 wherein the acrylic monomer is methyl methacrylate.

4. The method as recited in claim 1 wherein the amount of active catalyst comprises approximately 1.6–3.8% by weight of the sealant mixture.

5. The method as recited in claim 1 wherein the catalyst is benzoyl peroxide.

6. The method as recited in claim 1 wherein the catalyst also lowers the temperature at which the blowing agent is activated.

7. The method as recited in claim 1 wherein the sealant mixture is further comprised of approximately 5 to 10 parts by weight of a filler.

8. The method as recited in claim 1 wherein the sealant mixture is further comprised of approximately 5 to 20 parts of a plasticizer.

9. The method as recited in claim 1 wherein the sealant mixture is further comprised of approximately 5 to 20 parts of a filler and approximately 5 to 20 parts by weight of a plasticizer.

10. The method as recited in claims 7 or 9 wherein the filler is a polyethylene powder.

11. The method as recited in claims 8 or 9 wherein the plasticizer is dioctyl maleate.

12. A two compartment container containing an unreacted multicomponent sealing system for sealing pipe sections which is activated by mixing, comprising a rupturable inner compartment, means for mixing the components of the sealing system and means for transferring the mixed activated sealant system from the sealed container to a mold surrounding the pipe section, the mold having a mold cavity above the leaking pipe section, the container being characterized in that:

a first main compartment has therein a mixture of components comprising an exothermically reactive thermosettable acrylic adhesive and a blowing agent, a second compartment has therein a catalyst which, upon the rupture of the second compartment and the mixing of the catalyst with the components in the first compartment, is effective to activate the acrylic, whereby upon pumping the mixed activated material into and filling the mold cavity prior to significant reaction of the acrylic, the reaction of the acrylic proceeds to completion with a concomitant temperature rise, decomposition of the blowing agent, and an increase of the pressure within the mold cavity causing the mixture to expand and to flow into the interstices of the leaking pipe section, and upon cooling and solidification is bonded to the surface of the pipe.

13. The container as recited in claim 12 wherein the acrylic adhesive is comprised of an elastomeric modified polyacrylic and an acrylic monomer.

14. The container as recited in claim 12 wherein the acrylic monomer is methyl methacrylate.

15. The container as recited in claim 12 wherein the amount of active catalyst comprises 1.6–3.8% by weight of the sealant mixture.

16. The container as recited in claim 12 wherein the catalyst is benzoyl peroxide.

17. The container a recited in claim 12 wherein the catalyst also lowers the temperature at which the blowing agent is activated.

18. The container as recited in claim 12 wherein the sealant mixture is further comprised of approximately 5 to 20 parts by weight of a filler.

19. The container as recited in claim 12 wherein the sealant mixture is further comprised of approximately 5 to 10 parts of a plasticizer.

20. The container as recited in claim 12 wherein the sealant mixture is further comprised of approximately 5 to 20 parts of a filler and approximately 5 to 20 parts by weight of a plasticizer.

21. The container as recited in claims 18 or 20 wherein the filler is polyethylene powder.

22. The container as recited in claims 19 or 20 wherein the plasticizer is dioctyl maleate.

23. A seal on a leak in a pipe section wherein the seal is an adhesive mass which is flowed into the interstices of the pipe and upon solidification is bonded to the surface of the pipe, the adhesive mass being characterized in that it is the reaction product of an exothermically reactive thermosettable acrylic adhesive concomitant with the decomposition of a blowing agent, the adhesive mass being further characterized as a dense, highly cross-linked solid having isolated blowholes therein.

24. The seal on a leak in a pipe section as recited in claim 23 which was formed by the method comprised of the steps of:

intermixing in a separate sealed chamber, an exothermically reactive thermosettable acrylic adhesive, a blowing agent and a catalyst which is effective to activate the acrylic, pumping the resulting mixture from the sealed chamber into a mold cavity located over the leak, filling the mold cavity prior to significant reaction of the acrylic, maintaining the mold in a sealed condition and permitting the reaction of the acrylic to proceed to completion with a concomitant temperature rise, decomposition of the blowing agent and an increase of the pressure in the mold whereby the sealant mixture is flowed into the interstices of the pipe and upon cooling and solidification is bonded to the surface of the pipe.

* * * * *